J. O. PERSONS.
APPARATUS FOR LINING PIPES.
APPLICATION FILED AUG. 20, 1909.
1,016,770.
Patented Feb. 6, 1912.
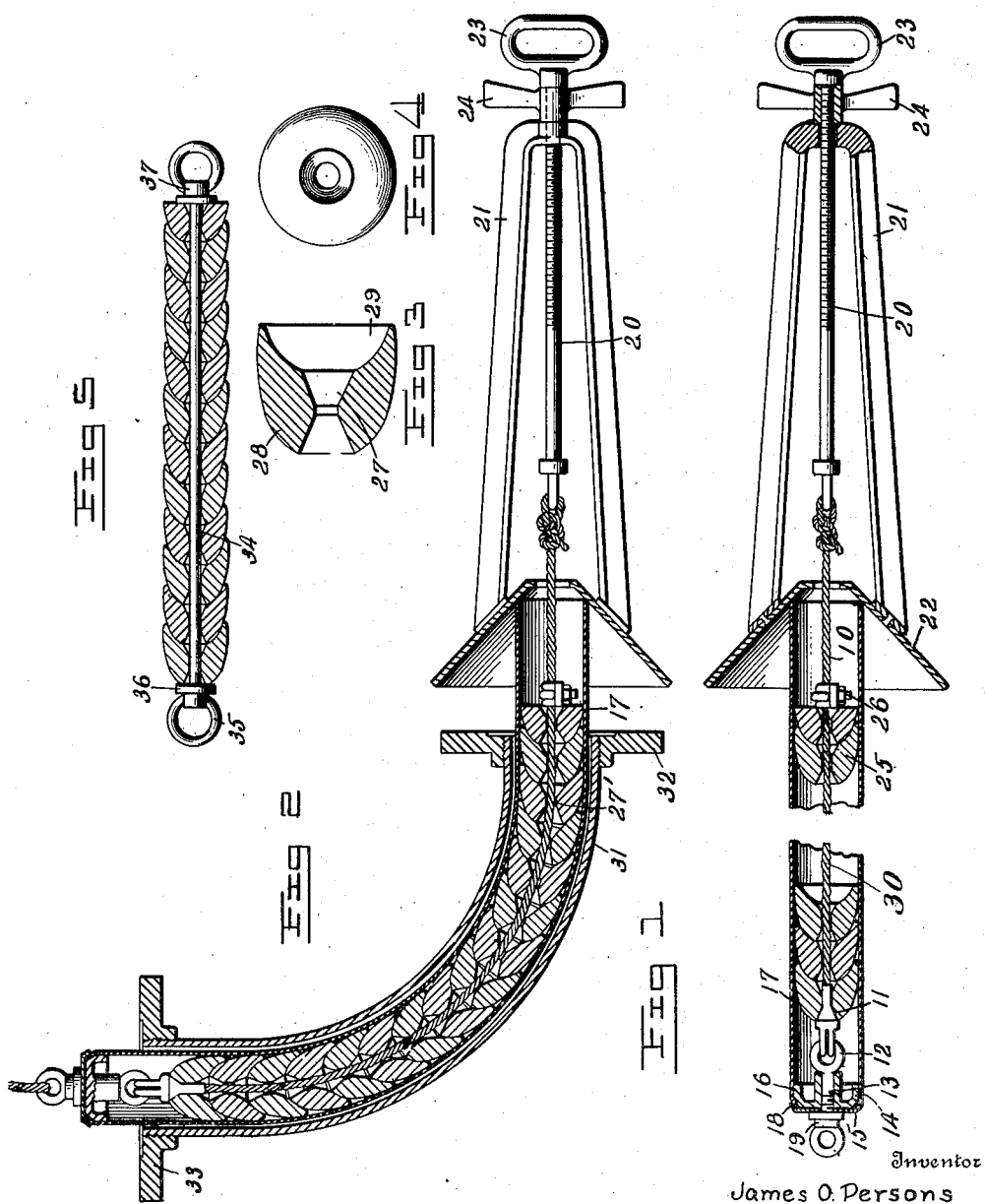
Inventor
James O. Persons

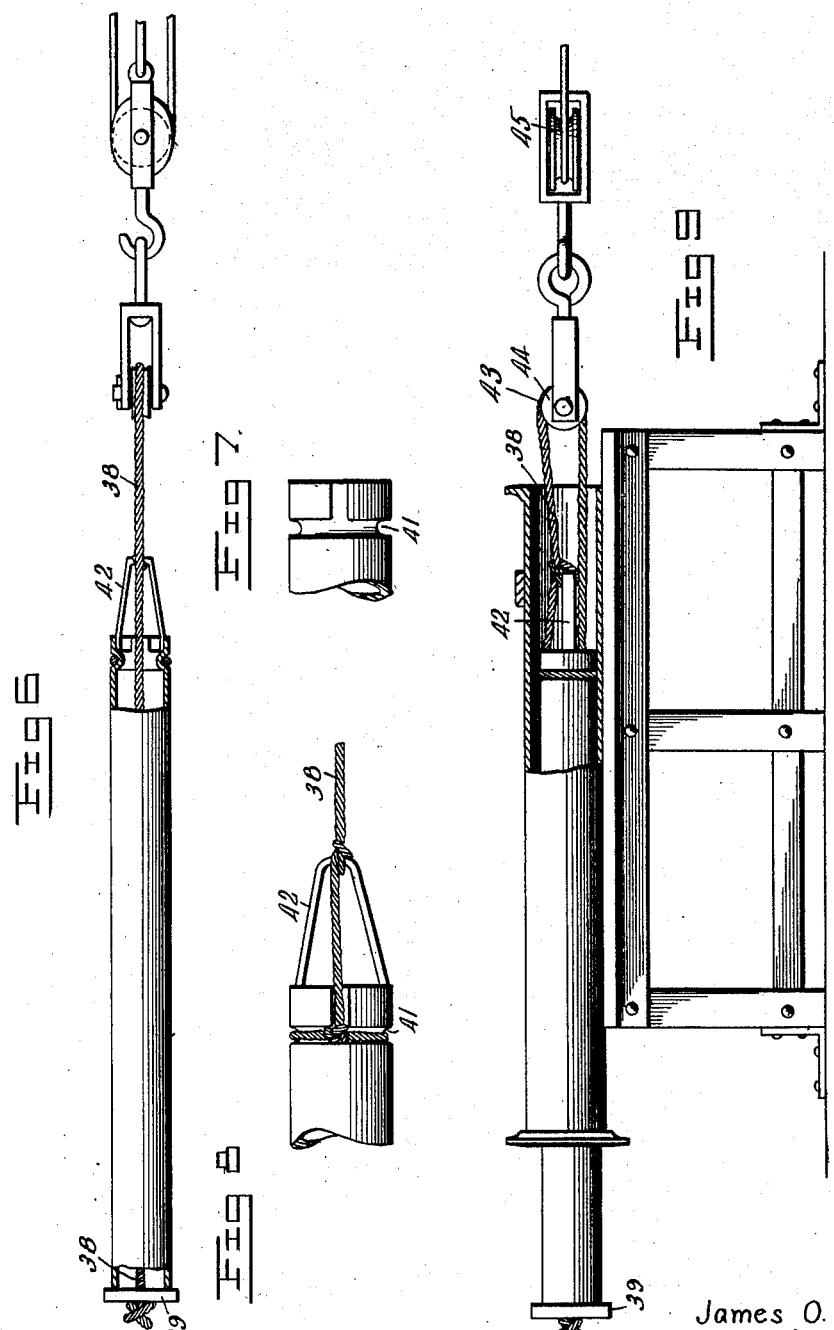

UNITED STATES PATENT OFFICE.

JAMES O. PERSONS, OF NORFOLK, VIRGINIA.

APPARATUS FOR LINING PIPES.

1,016,770.    Specification of Letters Patent.    Patented Feb. 6, 1912.

Application filed August 20, 1909. Serial No. 513,870.

*To all whom it may concern:*

Be it known that I, JAMES O. PERSONS, a citizen of the United States, residing at Norfolk, in the county of Norfolk and State of Virginia, have invented new and useful Improvements in Apparatus for Lining Pipes, of which the following is a specification.

My invention relates particularly to apparatus for assembling the piece of pipe to be lined and lining material in proper relation to each other for the subsequent operation by which the lining is expanded by a suitable process into intimate contact with the inside of the pipe.

More specifically stated, my invention consists in an improved device of this type comprising a flexible member attached to the lining, preferably at each end of the lining, and provided intermediate its ends with a plurality of loosely mounted adjoining members adapted to fill the tube of such lining material and to contact with the walls thereof in such manner as to prevent bending, buckling or kinking of the tube as it is drawn into the pipe by the application of stress to the apparatus. My apparatus is particularly adapted for drawing straight tubes of lining material into curved pipe, although it will be understood that it possesses many appreciable advantages for use with straight pipe.

My apparatus possesses advantages of construction in its details which combine admirably to produce the most efficient result. These detailed advantages of construction, as well as their coöperation to produce an efficient apparatus as a whole, will readily be apparent from the following specification, and the specific points of novelty of my invention will be pointed out in the annexed claims.

In the drawings accompanying this specification, Figure 1 is a sectional view of my apparatus. Fig. 2 is a sectional view of the same in connection with a tube of lining material inserted within a section of curved pipe. Figs. 3 and 4 are details of one of the filling pieces composing the flexible mandrel. Fig. 5 is a view of a modification, and Figs. 6 to 9 are views of a still further modification in which the filling pieces composing the mandrel are omitted, in which Fig. 6 is a view in section of lining material showing the cable applied, Fig. 7 is an enlarged view of one end of this section of lining material, the cable being omitted, Fig. 8 is a similar view showing the cable attached, and Fig. 9 is an assembled view showing the application of the lining to the pipe by my improved means.

Referring to Fig. 1 of the drawings, 10 is a flexible cable of any suitable material. At one end there is attached to it a hook 11 adapted to connect with an eye 12 of an eye-bolt 13. This eye-bolt 13 is screw-threaded and is of sufficient length to accommodate two clamping members 14 and 15 for receiving the end of a tube of lining material. These clamping members 14 and 15 should be of such size as to properly clamp the end of the tube. It will be noted that the member 14 is provided with a cylindrical surface 16 of the same diameter as the tube of lining material (17 as shown) and a surface 18 at an angle to the surface 16. The member 15 is provided with an internal conical surface to coöperate with the surface 18. A nut 19 provided with an eye threaded on the end of the eye-bolt 13 holds the parts together. The other end of the flexible member 10 is attached to the end of a screw-threaded rod 20 which passes loosely through a U-shaped yoke 21 whose ends bear on the outer surface of a conical member 22, adapted to straddle the end of a tube of lining material (as 17). The rod 20 is screw-threaded and provided with a handle 23 and a wing nut 24 for its manipulation and adjustment. Intermediate the ends of the cable 10 are a number of members 25 wound on the cable and held in position by means of a clamp 26 gripping the cable. These members are of a shape shown in Figs. 3 and 4, each being provided with a hole 27 through the center, a rounded nose 28 on one end and a concave rear end 29 into which the nose of a following member is adapted to fit. The holes 27 are made divergent from a point intermediate the ends thereof to better accommodate the flexible cable, as will hereinafter appear.

In using my invention the procedure is substantially as follows: The cable 10 is threaded through a section of lining material by any suitable means, and thereafter a number of members 25 are threaded on the cable, the number depending upon the length of the section of lining material, and the clamp 26 confining them is fastened to the cable. The eye-bolt 12 is next attached to the hook 11 and the member 14, corresponding to the size of the particular lining tube 17, is placed over the eye-bolt, and by means of a mallet or hammer the end of the tube is then headed over the conical surface 18 and a member 15 of suitable size is placed on top of it and clamped hard down by means of the nut 19 threading onto the eye-bolt 12. The conical member 22, carrying the yoke 21 and rod 20, is then placed over the opposite end of the tube and the end of the cable at that end of the tube attached to the end of the rod 20, as shown. By properly manipulating the wing nut 24 bearing against the end of the yoke slack in the cable is taken up and the stress on the cable can be made anything desired. This done, the cable 30 is attached to the eye of the nut 19 and threaded through the pipe into which it is desired to draw the lining material. The lining material is drawn through the pipe by this cable 30 without buckling or bending, the stress applied to the cable 30 in the drawing in operation being transmitted to both ends of a tube of lining material, being applied directly at the forward end and through the cable 10 and the rod and yoke 20 and 21, constituting tension devices to the opposite end. In Fig. 2 this drawing in operation is illustrated with the section of lining 17 applied to a section of a curved pipe 31. The lining is shown as fully drawn in, it having been entered at the end 32 of the pipe and drawn through by the cable 30 until its forward end reaches the end 33, as shown.

My invention is particularly adapted to a lining of curved pipe, as has been heretofore stated. By reference to Fig. 2, it will be seen that the members 25 form a flexible mandrel, the nose of each member fitting within the concave rear end 29 of the advance member, and as a section of lining is pulled within the pipe around a bend the members turn upon each other, accommodating themselves to the bend and effectually preventing any buckling or kinking of the lining. By virtue of their peculiar shape they do not clog the lining or increase its diameter by any slight amount, but act freely within it, forming a flexible mandrel of constant diameter. The peculiar shape of the holes 27 give still further freedom to the members 25 in their movements, the central portions 27' being in effect the pivot point of the members 25, the members turning freely about the cable 10. During the operation of drawing in it is convenient to station an operator at each end of the pipe, one applying stress to the cable 30 and the other manipulating the rear end of the apparatus through the handle 23, which he grips. The rear end of the tube can be worked to and fro as the drawing in operation takes place, and stress on the cable 10 can be readily adjusted by the wing nut 24. It will be seen that the conical member 22 is adapted to fit the ends of pipe of various sizes, and also automatically adjust itself to the end of the pipe.

The modification of Fig. 5 differs from the just described apparatus in the substitution of a flexible rod 34 for the cable 10 of Fig. 1. This rod, of course, will be of varying lengths, depending upon the length of the pipe to be lined. It is provided on one end with an eye 35 and a washer 36, and on the other end with a confining nut 37 provided with an eye for the attachment of the cable.

In Figs. 6 to 9 is shown an apparatus more particularly adapted for use in connection with straight pipe, although it may be readily used with curved pipe where the bends are not too sharp. It consists of a cable 38 attached at one end to a member 39 straddling the rear end of the pipe and at the other end attached to the front end of the pipe. This attachment at the front end may be by simply tying in the groove 41 formed in the end of the tube or by tying to a bail 42 suitably secured to that end of the tube. In the bight of the cable 43 is placed a pulley block 44 to which stress may be applied by any suitable means, such as a tackle 45 for drawing the attachment within the pipe. This is shown very clearly in Fig. 9.

It will thus be seen that I have produced an apparatus very practical and efficient. In actual use it has served its purpose without trouble and has proven very durable, I have found that it is applicable alike for straight and curved pipes of both small and large sizes.

The pipe as lined by simply expanding the metal tube which has been drawn into it is very serviceable when used on pressures higher than atmospheric pressure, but it sometimes happens that this pipe is used in connection with suction devices and vacuum apparatus. In such cases it sometimes happens that the lining is drawn away from the walls of the pipe so far sometimes as to partially or wholly close the pipe. I have found that a cement may be used in connection with the lining which cements the lining to the walls of the pipe and prevents it from being drawn away. This cement I apply to the lining before it is drawn into the pipe, as heretofore described, expanding the lining and pressing it into intimate contact with the walls of the tube after the lining has been drawn in. It requires but a short time for the cement which I use to set, and it thereafter holds the lining firmly in place.

In assembling the linings within the pipes I have found that great friction exists between the lining and the pipe, particularly with curved pipes, and this friction sometimes results in a cutting of the lining which makes it injuriously thin at certain points. In order to prevent this and to secure an easy passage of the lining into the pipe, I lubricate its exterior surfaces with a suitable lubricant, I have found tallow very good for this purpose.

When I use the cement I prefer to make it of such composition that it serves both as a lubricant for the lining, while it is being drawn into the pipe, and as a cement after the lining has been drawn in and expanded.

While I have described the best form of my invention now known to me, it is obvious that many changes may be made in the details thereof, without departing from the scope of the claims.

What I claim is:

1. An apparatus for drawing a section of lining material within a conduit to be lined comprising a flexible member adapted to extend through the section, means at one end of the flexible member for connecting the member to the section at that end and transmitting stress applied to the flexible member to the section at said end, and means at the other end of the flexible member for engaging said section at its opposite end, whereby such stress will be simultaneously applied to the section at said opposite end.

2. An apparatus for drawing a section of lining material within a conduit to be lined comprising a flexible member adapted to extend lengthwise through the section of material means for fixedly attaching to it the lining at the advanced end, and a series of filling members carried by the flexible member, said filling members having expanding outer surfaces adapted to contact with the inner walls of the section.

3. An apparatus for drawing a section of lining material within a conduit to be lined comprising a flexible member adapted to pass through the section and to be rigidly attached to it at one end, a series of filling members carried by the flexible member within the section, and means for connecting the flexible member with the other end of the section.

4. An apparatus for drawing a section of lining material within a conduit to be lined comprising a flexible member adapted to pass through the section and to be rigidly attached to it at one end, a series of filling members carried by the flexible member within the section, and adjustable means for connecting the flexible member with the other end of the section whereby the tension of the flexible member between the ends of the section may be adjusted.

5. An apparatus for drawing a section of lining material within a conduit to be lined, comprising a flexible member, means for attaching the said member to one end of the section of lining material comprising two coöperating clamping members secured to the flexible member and of an external diameter substantially equal to the diameter of the section adapted to receive the end of the section, and means for clamping the members together and upon the end of the section.

6. In an apparatus for drawing a section of lining material into a conduit to be lined, means for attaching the member through which stress may be applied to the end of the section comprising two clamping members with coöperating conical clamping plates of an external diameter substantially equal to the diameter of the section and adapted to receive the end of the section, means for clamping them together about the section, and a flexible member secured to said fastening means and adapted to extend lengthwise of the section.

7. An apparatus of the character described comprising a flexible mandrel composed of a flexible member, a series of filling members closely fitting on the flexible member and bearing directly against each other, each of said filling members having a central opening flaring at its opposite ends and merging at one end into a concaved face in the filling member, each of the filling members further having a rounded nose at its opposite end snugly and movably fitting in the concaved face of the adjoining filling member and being provided with an expanding outer surface for direct contact with the inner walls of the section.

8. In an apparatus of the character described, a series of filling members provided with openings, a flexible member threaded through the openings for supporting the filling members, the openings flaring toward the opposite ends of the filling members to provide an intermediate hinge portion to snugly engage the flexible member whereby the filling members are free to swing about the hinge portion and accommodate themselves to a section, and means for holding said filling members upon the flexible member.

9. A filling member for flexible mandrels comprising a body having a rounded nose at one end and flaring from the nose to its opposite end, the opposite end of the body being concaved and rounded to snugly and slidably receive the nose of an adjoining filling member, the body having an axial opening flaring at the ends of the body, and providing an intermediate contracted portion for snugly receiving a flexible support and to admit of the swinging of the body thereabout.

10. An apparatus for drawing a section of lining material into a conduit to be lined comprising a flexible member adapted to be passed through the section, means for rigid attachment of the flexible member to the section at one end, a conical member adapted to straddle the opposite end of the section, and a yoke to which the flexible member is adjustably attached bearing on said conical member, whereby the flexible member is advanced uniformly with the lining in which it is placed.

11. An apparatus of the character described comprising a flexible member, means at one end of said flexible member for attaching it to a section of lining material, means at the other end of said member for transmitting stress to the opposite end of the section of lining material and comprising a screw-threaded rod to which the flexible member is connected, a yoke through which the rod passes, and a cone shaped member adapted to fit the other end of the section and on which the end of the yoke is adapted to bear.

12. An apparatus of the character described, comprising a flexible member, means at one end of said flexible member for attaching it to a section of lining material, means at the other end of said member for transmitting stress to the opposite end of the section of lining material and comprising a screw-threaded rod to which the flexible member is connected, a yoke through which the rod passes, a cone shaped member adapted to fit the other end of the section and on which the end of the yoke is adapted to bear, and means for adjusting the rod with respect to the yoke.

13. An apparatus of the character described, comprising a flexible mandrel adapted to be threaded lengthwise through a section of lining material, and means at one end thereof for attaching thereto the section of lining material through which the said mandrel is threaded, said means comprising two coöperating clamping plates, and means for clamping them together.

14. An apparatus of the character described, comprising a flexible cable, a plurality of filling members strung thereon, means confining the filling members on the cable, said flexible cable and filling members being adapted to be threaded through a section of lining material, and means at one end of said flexible cable for attaching the same to the section of lining material through which it is threaded, said means comprising two coöperating clamping plates, and means for clamping them together.

15. A filling member comprising a body having a central bore flaring toward the ends of the body, and providing an intermediate contracted portion adapted to snugly receive a flexible member and about which the filling member is adapted to swing.

16. The method of threading a section of lining material through a pipe which consists in threading a flexible mandrel through the section, attaching the mandrel to the section at the advanced end and thereafter pulling the section into the pipe advanced end free.

17. The method of threading a section of lining into a pipe which consists in placing a flexible mandrel within the section and thereafter drawing the section into the pipe by applying stress simultaneously to each end of the section of lining material and to the mandrel.

In testimony whereof I have hereunto set my hand in presence of two subscribing witnesses.

JAMES O. PERSONS.

Witnesses:
J. G. Darbox,
Charles Lowell Howard.